Feb. 12, 1952  R. GOLDSTEIN  2,585,308
EXTERIOR REARVIEW CONTROLLED MIRROR
Filed Jan. 24, 1950
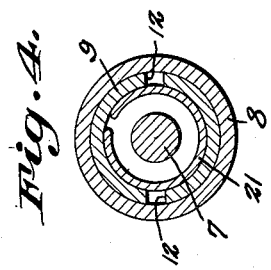
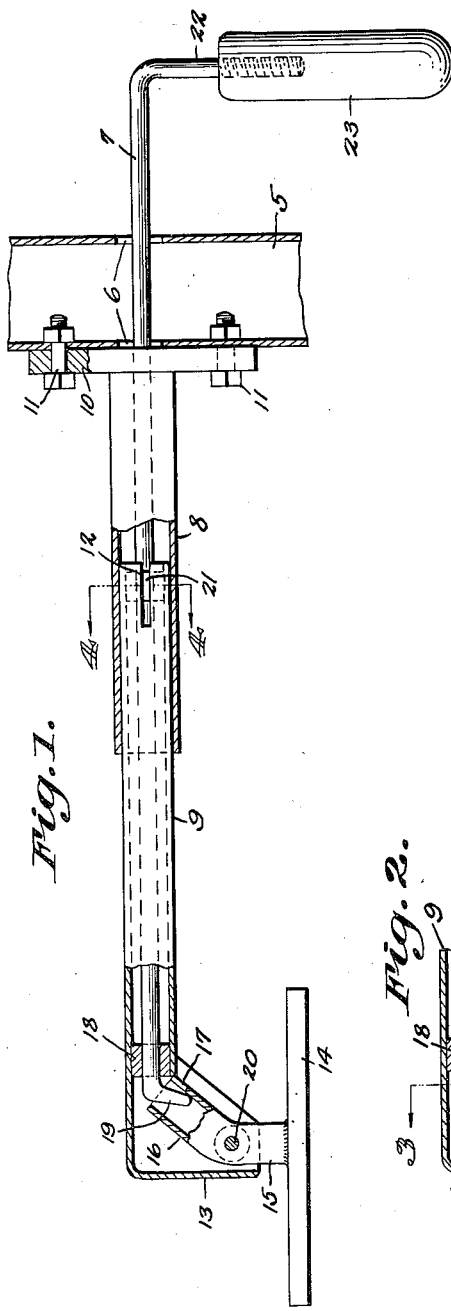
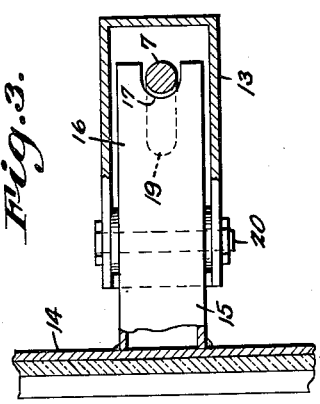
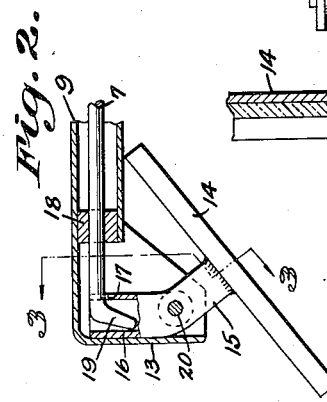
R. Goldstein
INVENTOR
BY *C. A. Snowles*
ATTORNEYS.

UNITED STATES PATENT OFFICE 2,585,308

EXTERIOR REARVIEW CONTROLLED MIRROR

Reuben Goldstein, Pittsburgh, Pa.

Application January 24, 1950, Serial No. 140,303

1 Claim. (Cl. 88—98)

This invention relates to rear view mirrors designed primarily for use on motor vehicles, and more particularly to rear view mirrors mounted exteriorly of the vehicle, means being provided for controlling the mirror from the interior of the vehicle, to vary the angle of the mirror for viewing the road at the rear of the vehicle, from various angles.

An important object of the invention is to provide a support and control mechanism for a rear view external mirror which may be extended or retracted to properly locate the mirror for a particular viewing of the road surface at the rear of the vehicle.

Another object of the invention is to provide a support embodying telescoping sections with means for automatically securing the telescoping sections in their positions of adjustment.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Figure 1 is a plan view, partly in section, illustrating a rear view externally mounted mirror support, and operating means.

Fig. 2 is a sectional view through the outer end of one of the sections of the support illustrating the mirror as moved to its extreme position in one direction.

Fig. 3 is a sectional view taken on line 3—3 of Fig. 2.

Fig. 4 is a sectional view taken on line 4—4 of Fig. 1.

Referring to the drawing in detail, the reference character 5 indicates a motor vehicle door which is provided with aligning openings 6 through which the control rod of the mirror, indicated by the reference character 7, passes.

The arm which supports the mirror, embodies telescoping sections 8 and 9, the section 8 being tubular and provided with a securing flange 10 which is bolted to the door, by means of bolts 11.

The section 9 of the supporting arm, is also tubular and has its inner end split at 12 providing expansible sections which when forced into contact with the inner surface of the section 8, will set up a binding action, to secure the telescoping section 9 in its positions of adjustment within the section 8.

The outer end of the section 9 is enlarged, providing the housing 13, the inner side of the housing being open, as clearly shown by the drawing.

The reference character 14 indicates the rear view mirror, which is provided with a bracket 15 which extends from the rear surface thereof, the bracket 15 including the offset end 16 disposed at an oblique angle with respect to the main portion of the bracket. The inner end of the bracket is tubular and is formed with a cut out portion 17 in the edge thereof providing a clearance for the control rod 7 when the bracket 15 has been moved from the position shown by Fig. 1 of the drawing, to the position shown by Fig. 2, wherein the angle of the rear view mirror has been appreciably reduced from the ninety degree angle.

Disposed within the telescoping section 9 of the supporting arm, is a friction bearing member 18 through which the outer end of the control rod 7 extends. The outer end of the control rod 7 is formed with a right angled end 19 which is disposed within the hollow offset end 16 of the bracket 15, in such a way that as the control rod 7 is moved longitudinally of the supporting arm, the bracket 15 will be tilted to vary the angle of the rear view mirror 14.

The bracket 15 is of a length so that when the mirror 14 has been moved to the ninety degree angle, or the limit of movement to properly view the rear road, the inner end of the bracket engages the end of the section 9, as shown by Fig. 1, restricting further movement of the bracket and mirror to insure against the mirror 14 being moved too far to defeat the purpose of the mirror.

When the rod 7 is pushed outwardly, the angle of the mirror may be changed as desired between its innermost position, and the ninety degree position to meet the requirements of the operator of the vehicle.

The bracket 15 is provided with openings to accommodate the pivot bolt 20 by means of which the mirror 14 is pivotally supported. It will of course be understood that the housing 13 is also provided with openings that align with the openings in the bracket, to receive the pivot bolt 20.

Mounted within the inner end of the section 9 of the supporting arm is a steel snap spring 21 which contacts with the section 9 at the split portion 12 thereof, the snap spring 21 acting to normally urge the split portion of the section 9 outwardly against the inner wall of the section 8, setting up a binding action to restrict movement of the section 9 with respect to the section 8.

The inner end of the rod 7 is disposed at right angles with respect to the main portion thereof as at 22, the right angled portion being threaded to accommodate the handle 23 which is screwed thereon.

The handle 23 is of course disposed within the body of the vehicle on which the external rear view mirror is secured, so that the operator will have ready access thereto.

From the foregoing it will be seen that should it be desired to extend the supporting arm, it is only necessary to force the control rod 7 outwardly, whereupon the offset end 16 of the bracket 15 will be moved into engagement with the outer end of the housing 13. Further movement of the rod 7 outwardly, will tend to extend the outer section of the supporting arm. The operator may now move the control rod 7 inwardly with the result that the mirror may be rocked on its pivot to the desired angle.

When it is desired to move the sections 8 and 9 to their telescoped position, the rod 7 is pulled with the result that the inner edge of the offset end 16 of the mirror is pulled into engagement with the outer end of the section 9. Further inward movement of the rod will tend to draw the section 9 into the section 8.

With this type of rear view mirror, it is obvious that practically any desired angle of the mirror may be obtained to meet the requirements of use.

It will also be noted that the rear view mirror may be tilted vertically should it be desired to move the mirror to eliminate glare of the headlights of motor vehicles approaching from the rear.

Having thus described the invention, what is claimed is:

In a rear view mirror for external use on motor vehicles, a supporting arm embodying hollow telescoping sections rotatable with respect to each other, a friction bearing in one of the sections, a control rod extending through the sections and held within the friction bearing, one end of the central rod being extended laterally and being tapered, a mirror bracket pivotally supported on one end of one of the sections, said mirror bracket including a hollow member in which the right angled tapered end of the control rod extends effecting movement of the bracket and mirror vertically and horizontally varying the angular position of the bracket, a mirror supported on the bracket, and friction means for securing the sections against movement with respect to each other under normal conditions.

REUBEN GOLDSTEIN.

REFERENCES CITED

The following references are of record in the file of this patent:

UNITED STATES PATENTS

| Number | Name | Date |
|---|---|---|
| 2,260,597 | Beattie | Oct. 28, 1941 |
| 2,281,234 | Clark et al. | Apr. 28, 1942 |
| 2,315,260 | Lancaster | Mar. 30, 1943 |
| 2,330,444 | Park | Sept. 28, 1943 |
| 2,341,208 | Clark et al. | Feb. 8, 1944 |

FOREIGN PATENTS

| Number | Country | Date |
|---|---|---|
| 43,079 | Denmark | Sept. 19, 1930 |